April 5, 1927.                    1,623,677
J. C. HEINTZ
VULCANIZING APPARATUS
Filed July 13, 1925
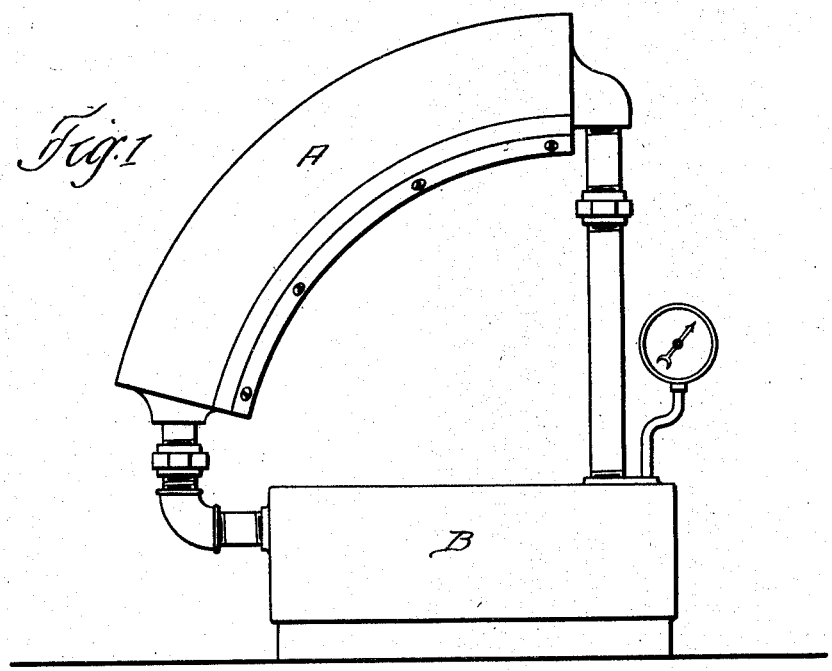
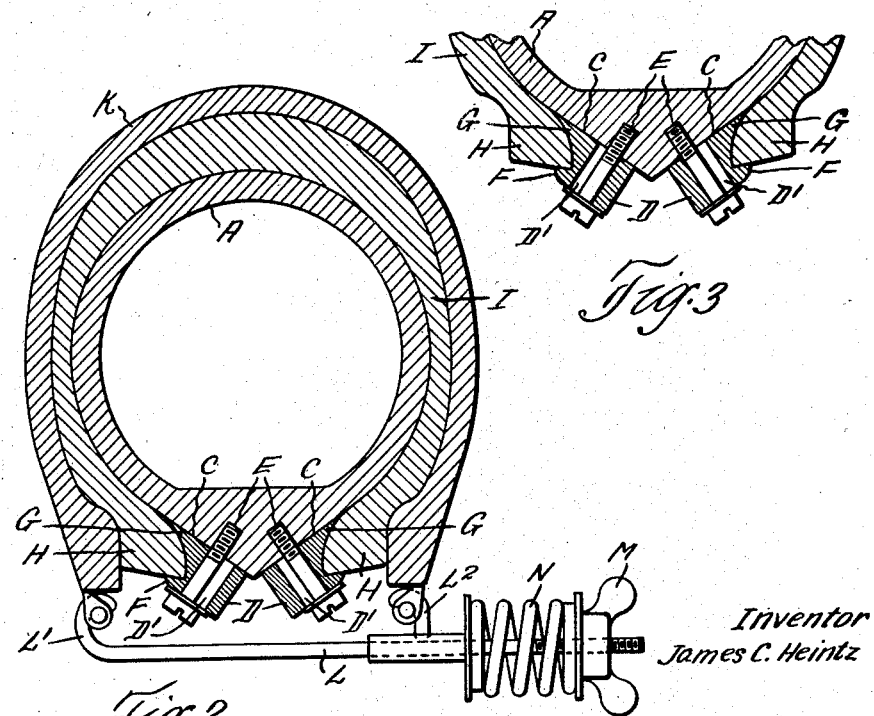
Inventor
James C. Heintz
By Hill Brock & West Attys.

Patented Apr. 5, 1927.

1,623,677

UNITED STATES PATENT OFFICE.

JAMES C. HEINTZ, OF LAKEWOOD, OHIO.

VULCANIZING APPARATUS.

Application filed July 13, 1925. Serial No. 43,141.

This invention relates generally to a vulcanizing device or apparatus and more particularly to one employed in vulcanizing or curing repair work in autmobile tire casings.

The object of the invention is to provide a simple, efficient, inexpensive and easily manipulated apparatus capable of use in connection with a number of different size casings through the medium of a minimum number of parts and adjustments.

Other objects of the invention will appear as the description proceeds.

Briefly stated, the invention consists in adjustably connecting to the central core shoes or blocks for engagement with the beads of the casing during vulcanization and by means of which various sizes of casings can be accommodated upon this apparatus by simple adjustments. The invention consists also in certain details of construction and in the novel manner of combining or arranging the same all of which will be fully described hereinafter and set forth in the appended claims.

In the drawings forming a part of the specification, Fig. 1 is a side elevation of an apparatus embodying one form of my invention; Fig. 2 is a transverse sectional view taken through the central core and illustrating the adjustable shoes or blocks in engagement with the beads of the tire casing and also illustrating the enveloping covering used during the vulcanizing operation; Fig. 3 is a detail sectional view illustrating the adjustable shoes or blocks shifted for engagement with a tire casing smaller than the one illustrated in Fig. 2.

In carrying out my invention I employ a hollow arcuate shaped metallic core A having inlet and outlet pipes connecting the same with a suitable steam or vapor generator B for supplying the heating medium to said hollow central core.

While I have shown this form of heating medium it will of course be understood that any other suitable form of heating device may be employed as that constitutes no part of the present invention.

The outer or top side of the hollow core is shaped to conform to the tire casing. The inner or lower side, however, tapers as indicated at C and adjustably connected to the tapering sides are the adjustable shoes or blocks D, these shoes or blocks D being slotted as indicated at D' for the passage of the bolts E by means of which these shoes or blocks are connected to the tapering faces of the core. The bolt apertures being slotted permit a certain amount of lateral adjustment of these shoes or blocks and by means of which various sizes of tire casings can be accommodated. The inner face of each shoe is made plain to contact with the plain surface of the core and at each side each shoe or block is formed with an outwardly extending shoulder F which in connection with the undercut portion G provides the suitable shape for receiving the bead H of the tire casing I.

In operation the tire casing is placed upon the hollow core with the repaired portion contacting therewith and the shoes or blocks D are adjusted as shown in Figs. 2 and 3 in order to engage the bead portions of the tire casing and then a suitable enveloping cover K of non-conducting material is placed over that portion of the tire casing which is in contact with the hollow core. This covering is held in place by means of clamping rods L having a fixed hook L' and an adjustable hook $L^2$ engaging eyes arranged at opposite sides of the covering K.

Tension is applied through the medium of a wing nut M screwed upon the threaded end of the rod L, a coil spring N being interposed between the wing nut and the collar arranged in connection with the adjustable hook $L^2$.

After the tire casing has been properly adjusted upon the hollow core and the covering K applied thereto and the hook rods tightened up to provide the proper binding tension, the heat is maintained for the requisite period of time thereby completing the vulcanizing or curing operation, after which the cover is lifted off and the tire casing readily removed from the apparatus.

The shoes D connected to the angularly disposed faces of the core hold the beads of the tire casing in their proper relative positions during the vulcanizing operation and by having these blocks adjustable they can be very easily and quickly shifted to accommodate different sizes of tire casings, thereby rendering the apparatus as a whole usable with fewer parts and adjustments than apparatus previously employed.

Having thus described my invention, what I claim is:

1. In a vulcanizing apparatus, a core and the adjustable shoes connected directly to said core and positioned for engagement with the beads of a tire casing arranged about said core.

2. In a device of the kind described, a hollow arcuate shaped core having angularly disposed surfaces along its inner side and adjustable blocks connected to said surfaces, said blocks or shoes being shaped for engagement with the beads of a tire casing arranged upon the core.

3. In a device of the kind described, a hollow arcuate shaped core having angularly disposed surfaces along its inner side, adjustable blocks or shoes connected to said surfaces and shaped for engagement with the beads of a tire casing arranged upon said core and a covering adapted to envelope that portion of the tire casing arranged upon said core.

4. In a device of the kind described, a hollow arcuate core having angularly disposed surfaces along its inner sides, adjustable shoes or blocks connected to said surfaces and provided with oppositely disposed shoulders and undercut surfaces to receive the heads of a tire casing, and means for connecting said shoes or blocks to said core.

5. In a device of the kind described, an arcuate core having angularly disposed surfaces along its inner side, shoes or blocks having flat surfaces adapted to contact with said angularly disposed surfaces of the core, said blocks being slotted, bolts passing through said slots and connecting the shoes or blocks to the core, the outer sides of said shoes or blocks being provided with shoulders and undercut surfaces for engagement with the beads of a tire casing arranged upon said core and a covering adapted to envelope that portion of the tire casing arranged upon said core, and means for applying tension to said covering.

In testimony whereof, I hereunto affix my signature.

JAMES C. HEINTZ.